United States Patent
Shintani et al.

(10) Patent No.: US 6,611,958 B1
(45) Date of Patent: Aug. 26, 2003

(54) ELECTRONIC PROGRAM GUIDE FEATURE FOR AV SYSTEM

(75) Inventors: Peter R. Shintani, San Diego, CA (US); Hisafumi Yamada, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/370,048

(22) Filed: Aug. 6, 1999

(51) Int. Cl.[7] .............................. G06F 3/00; H04N 7/16; H04N 9/00; H04N 5/91
(52) U.S. Cl. ............................. 725/58; 725/39; 725/40; 725/43; 725/46; 725/51; 725/53; 725/136; 386/1; 386/83
(58) Field of Search ............................. 725/39, 46, 53, 725/40, 43, 51, 136, 58, 134, 133, 141, 142, 153; 386/1, 83

(56) References Cited

U.S. PATENT DOCUMENTS

| | | | | |
|---|---|---|---|---|
| 5,036,394 A | * | 7/1991 | Morii et al. ................. 358/146 |
| 5,557,338 A | * | 9/1996 | Maze et al. ................. 348/565 |
| 5,589,892 A | | 12/1996 | Knee et al. |
| 5,686,954 A | * | 11/1997 | Yoshinobu et al. ........... 348/13 |
| 5,699,107 A | * | 12/1997 | Lawler et al. ................ 348/13 |
| 5,731,844 A | * | 3/1998 | Rauch et al. ................ 348/563 |
| 5,734,444 A | * | 3/1998 | Yoshinobu ................... 348/731 |
| 5,751,282 A | * | 5/1998 | Girard et al. ................ 345/327 |
| 5,808,694 A | | 9/1998 | Usui et al. |
| 5,867,226 A | * | 2/1999 | Wehmeyer et al. ......... 348/563 |
| 5,903,314 A | | 5/1999 | Niijima et al. |
| 5,907,323 A | * | 5/1999 | Lawler et al. .............. 345/327 |
| 5,909,212 A | | 6/1999 | Nishina et al. |
| 6,005,597 A | * | 12/1999 | Barrett et al. ................. 348/1 |
| 6,008,803 A | * | 12/1999 | Rowe et al. ................. 345/327 |
| 6,025,837 A | * | 2/2000 | Matthews, III et al. ..... 345/327 |
| 6,177,931 B1 | * | 1/2001 | Alexander et al. .......... 345/327 |
| 6,247,176 B1 | * | 6/2001 | Schein et al. ................. 725/43 |
| 6,298,482 B1 | * | 10/2001 | Seidman et al. ............ 725/101 |
| 6,344,878 B1 | * | 2/2002 | Emura ........................ 348/460 |
| 6,349,329 B1 | * | 2/2002 | Mackintosh et al. ........ 709/219 |
| 6,369,861 B1 | * | 4/2002 | Lownes ...................... 348/731 |
| 6,483,553 B1 | * | 11/2002 | Jung .......................... 348/731 |

* cited by examiner

*Primary Examiner*—Andrew Faile
*Assistant Examiner*—Son P. Huynh
(74) *Attorney, Agent, or Firm*—Thomas F. Lebens; Fitch, Even, Tabin & Flannery

(57) ABSTRACT

Methods and apparatuses for displaying broadcast history information of a plurality of episodes of a program on an audio-visual system, which enable a viewer to select a program for which the history information of each episode will be stored. In response to the viewer's selection, the audio-visual system stores the history information for the episodes of the selected program that has been received by the audio-visual system. The audio-visual system can display the history information when the viewer watches the current episode of the program in a future time.

20 Claims, 3 Drawing Sheets

ELECTRONIC PROGRAM GUIDE FEATURE FOR AV SYSTEM

BACKGROUND OF THE INVENTION

Printed television program guides can provide viewers with program information in a grid format. Specifically, in printed television program guides, the channel numbers are arranged along the vertical axis, the times are arranged along the horizontal axis, and the programs are listed in the cross sections of the channel axis and the time axis. Many printed television program guides also list programs alphabetically. Recently developed electronic program guides (EPG), in addition to having the features provided by the printed television program guides, also allow viewers to search a program database according to key words, such as the names of the actors, title, theme (drama, sports, news,), etc. Such EPGs have utility not just in televisions, but in all audio-visual (AV) systems, which can include TVs, videocassette recorders (VCRs), AV amplifiers, or even personal computers.

While existing EPGs can provide viewers with information about current and future programs, they are unable to provide information about the previous programs. This can be inconvenient to viewers. For example, if a viewer was unable to watch one or more previous episodes of a program, it is difficult for the viewer to follow the current episode. Some viewers may tape the episodes of a program they are unable to watch live. However, to know the gist of the recorded episodes, the viewers have to go through the tapes, and they often do not have time to do so before watching the current episode of the program. To these viewers, it would be desirable to display the description of the previous episodes of the program before watching the episode or while watching the current episode.

There is, therefore, a need for an improved EPG for an AV system that maintains the history information about the previous episodes of a program.

There is another need for an improved EPG for an AV system that can interactively display the history information about the previous episodes of a program.

There is yet a further need for an improved EPG for an AV system that can interactively display the history information about the previous episodes of a program while the current episode is being displayed on the audio-visual system.

The present invention provides an improved EPG for an AV system to meet these needs.

SUMMARY OF THE INVENTION

To overcome the shortcomings in the available art, the present invention provides a novel method for displaying information on a AV system by receiving history information in electronic form regarding a program, storing the history information in the AV system, and interactively displaying the history information on the AV system at a distant future time, e.g., a few days later. Preferably, the history information includes a description of the program.

Where the program includes a plurality of episodes, the method includes receiving history information in electronic form by means of the AV system regarding a previous one of the episodes of the program, storing the history information for the previous episode in the AV system, receiving by means of the AV system a current episode at a time subsequent to the previous episode, and displaying, for a viewer of the AV system, the history information for the previous episode. The current episode may be displayed on the AV system while the history information for the previous episode is also being displayed on the AV system. The history information can include a description of the previous episode.

Another embodiment of the invention is a method for receiving and displaying history information on a AV system regarding a program having a plurality of episodes and includes the steps of receiving both a broadcast of a particular episode of the program and history information, in electronic form, regarding the particular episode, determining whether any previous episodes of the program were stored in the AV system, and, if any previous episodes were stored in the AV system, automatically storing the history information for the particular episode in the AV system. In this embodiment, a current one of the episodes is received at a time subsequent to receiving the particular episode and the history information for the particular episode is displayed on the AV system. Further included can be the step of displaying the current episode on the AV system, while the history information regarding the particular episode is being displayed on the AV system. In this embodiment, the history information includes a description of the particular episode.

The invention is also embodied in an apparatus for displaying information on a AV system, comprising a receiver for receiving history information in electronic form regarding a program, a display screen, a memory for storing the history information, a controller for controlling the receiver, the display screen, and the memory, and a user activated controller for interactively causing the controller to display the history information on the display screen at a time chosen by the user. Preferably, the history information is a description of the program.

Where the program has a plurality of episodes, the apparatus according to the invention includes a receiver for receiving history information in electronic form by means of the AV system regarding a previous one of the episodes of the program and including receiving a current episode at a time subsequent to the previous episode, a memory for storing the history information for the previous episode in the AV system, a display screen for selectively displaying, for a viewer of the AV system, the history information for the previous episode, and a controller for controlling the receiver, the memory and the display screen. The controller preferably causes the display screen to display the current episode on the display screen while the history information for the previous episode is also being displayed on the display screen. The history information includes a description of the previous episode.

Still another embodiment of the invention is an apparatus for receiving and displaying history information on a AV system regarding a program having a plurality of episodes, comprising a receiver for receiving both a broadcast of a particular episode of the program and history information, in electronic form, regarding the particular episode, a display screen for displaying the program and the history information, a memory for storing the received history information, and a controller for controlling the receiver, the display screen and the memory. The controller determines whether any previous episodes of the program were stored in the AV system, and, if any previous episodes were stored in the AV system automatically stores the history information for the particular episode in the memory. When the receiver receives a current one of the episodes, the controller can cause the display screen to display the history information for a previous episode. The controller can also cause the display screen to display the current episode while the history information regarding the particular episode is being displayed on the display screen. The history information includes a description of the particular episode.

In the preferred embodiments, the AV system is a television system.

The present invention further encompasses an electronic program guide (EPG) circuit which includes an EPG processor circuit, including a central processing unit (CPU), supplied with a video signal input, a horizontal sync input, and a vertical sync input. The video signal input includes EPG program information in electronic form describing viewable programs which is extracted from the video signal by the EPG processor circuit. The EPG circuit further includes a read only memory (ROM) connected to the EPG processor circuit for storing a program used by the EPG's CPU, and a random access memory supplied with the EPG program information by the EPG processor circuit, for storing EPG program information for a plurality of episodes of a given program. The EPG can further include a non-volatile memory for storing user specific information pertaining to the EPG circuit.

The EPG processor circuit outputs an on screen display (OSD) signal for displaying the history information of a selected episode of a program.

The EPG program information can be derived from any suitable source. It can be extended data service data contained in the vertical blanking interval of the video signal or a cable system's out of band (OOB) data stream. Where the video signal is a digital signal, the EPG program information is in the digital signal's program specific information protocol (PSIP). The EPG program information can also be received via the Internet or a public switched telephone network.

BRIEF DESCRIPTION OF THE DRAWINGS

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENTS

To overcome the shortcomings in the existing art, the present invention provides a novel method and apparatus for displaying program history information on an AV system.

Figure 1:
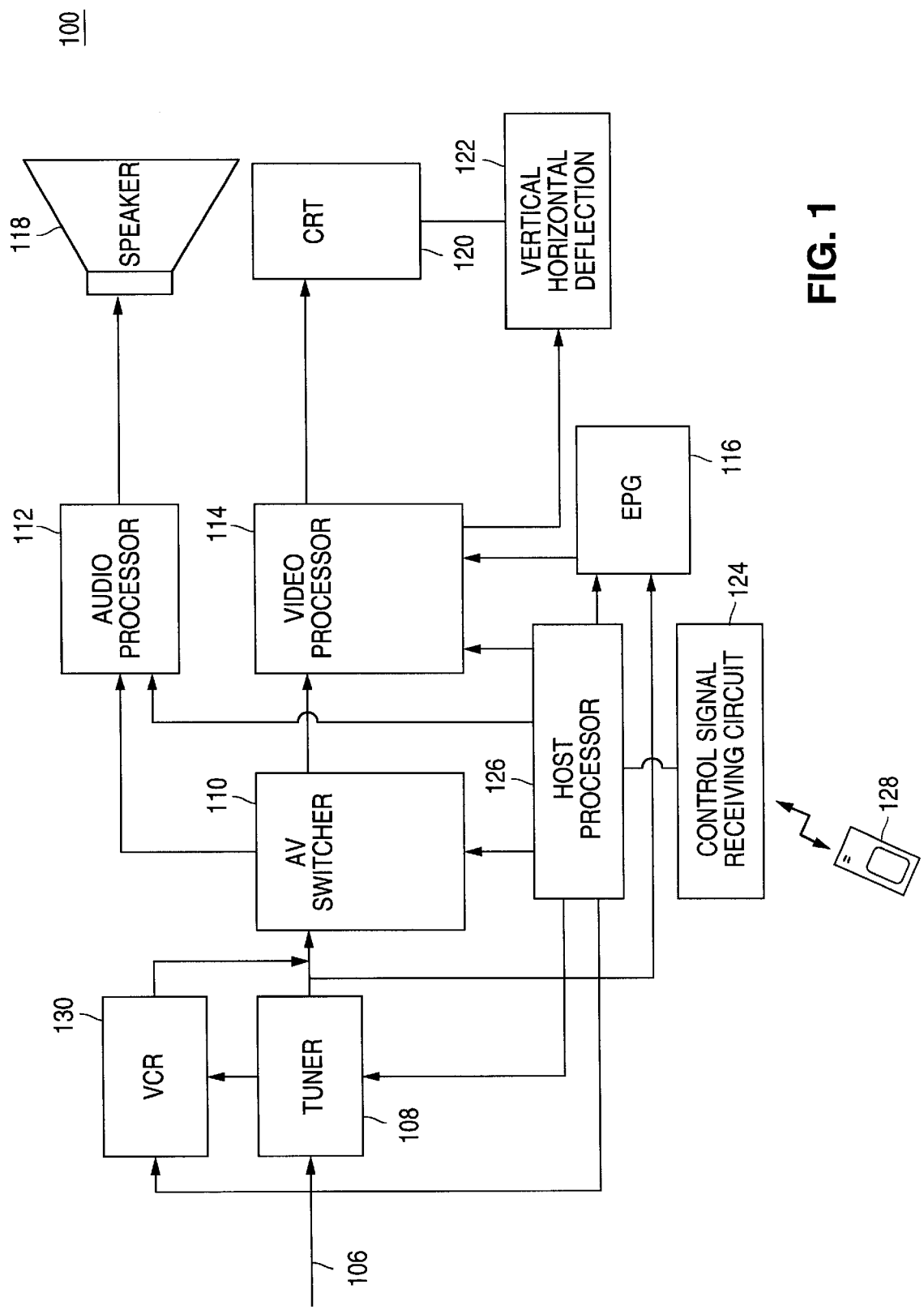
FIG. 1 shows an audio-visual system, in accordance with the present invention.

FIG. 1 shows an audio-visual system 100, in accordance with the present invention. It is to be understood that the audio-visual system 100 is merely one example of an AV system in which the EPG circuit of the present invention could suitably be used. Other suitable AV systems can include videocassette recorders (VCRs), AV amplifiers, or even personal computers.

As shown in FIG. 1, the audio-visual system 100 includes a tuner (receiver) 108 coupled to a signal input 106, which can be a TV antenna, a cable or satellite TV system, or an Internet feed, an audio-video (AV) switcher receiving an output from the tuner 108, an audio processor 112 which receives an audio output from the AV switcher 110, a video processor 114 which receives a video output from the AV switcher 110, and an electronic program guide (EPG) circuit 116 which receives an AV output from the tuner 108. A speaker 118 is connected to reproduce the audio output of the audio processor 112 and a cathode ray tube (CRT) 120 is connected to reproduce the video output of the video processor 114. The video processor 114 controls a vertical and horizontal deflection circuit 122 for the CRT 120. In the preferred embodiment, a video cassette recorder (VCR) 130 is supplied with an AV output of the tuner 108 for recording programs under viewer control and outputs a reproduced AV signal to the AV switcher 110. A host processor 126 controls all of the above-described elements, including programming for the VCR 130.

Figure 2:
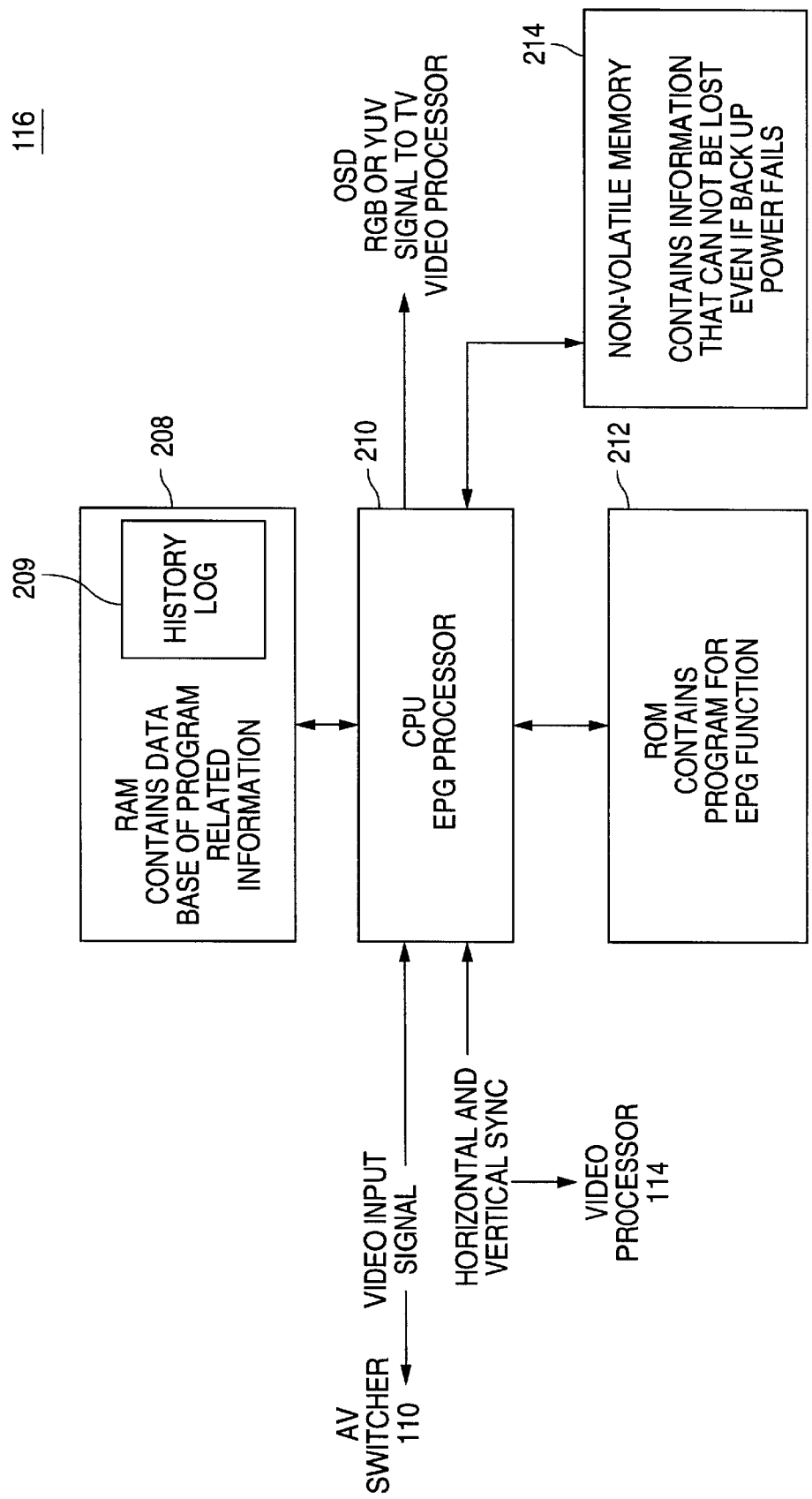
FIG. 2 shows the EPG (electronic program guide) of FIG. 1 in detail, in accordance with the present invention.

A remote control signal receiving circuit 124 is connected to provide an output to the host processor 126. A remote controller 128 communicates with the audio-visual system 100 via the control signal receiving circuit 124. The remoter controller 128 comprises a plurality of control buttons (including "Yes" and a "No" buttons) that can be selected by a viewer. In response to a selection of any one of the buttons, the remoter controller 128 sends a control signal to the control signal receiving circuit 124. Upon receiving the control signal, the control signal receiving circuit 124 sends the control signal to the host processor 126. In response, the host processor 126 controls the operation of the audio-visual system 100 according to the nature of the control signal. FIG. 2 shows the EPG circuit 116 of FIG. 1 in detail, in accordance with the present invention. The EPG circuit 116 comprises a RAM (random access memory) 208, an EPG processor 210, a ROM 212 (read only memory) for storing the program for the EPG, and an electronically erasable program read-only memory (EEPROM) 214. The processor 210 controls all of the elements of FIG. 2.

The EEPROM 214 contains information that must not be lost even if backup power fails or if the TV set is disconnected from the AC power line for an extended period, i.e., longer than a battery back up is capable of supplying power. Such information might be any data that the system has stored regarding the user's set-up information, e.g., whether there is there a cable box, the user's zip code and time zone, whether daylight savings is used, and what programs are scheduled for recording on the VCR 130.

The RAM 208 can be conventional flash memory or, more suitably, static RAM (SRAM) which will maintain information even after power is removed from the audio-visual system provided a small voltage is maintained for the RAM 208, such as by a small battery, a charged capacitor, or the like. RAM 208 could also be a very fast hard disk drive (HDD). RAM 208 stores a database of the program related information, including information for as many as 100 or more channels, with data going forward in time by as much as several weeks. Each channel requires storage of data pertaining to program titles, description, channel numbering, and so-called V blocking (parental censorship capability). Other data may be stored as well. This data must be maintained for each program at each hour for each channel. Additionally, the RAM 208 stores a short history for at least a limited number of channels that the EPG system 116 knows that the user normally watches. As will be explained further herein, this is made possible by the fact that the EPG system 116 knows what channels the viewer prefers to watch either through previous VCR 130 programming requests or even via normal viewing habits.

Most of the information stored in the RAM 208 is referred to herein as program history information, which is obtained from any arbitrary signal source containing the EPG information. This can be a low speed data stream called the extended data service (XDS) carried in line 21 of field 1 and line 22 of field 2 of NTSC signal programs. This occurs in the vertical blanking interval (VBI), which is lines 1–21 of field 1 and lines 1–22 of field 2 of an NTSC signal. The data could also be obtained from a proprietary source, such as GemStar, or in a digital TV signal's Program Specific Information Protocol (PSIP), via a telco modem, a pager modem, a cable system's Out of Band (OOB) data stream, or over the Internet if the audio-visual system is suitably connected to the Internet. The information could also be derived from a satellite receiver. In a typical EPG system, such as GemStar, the main program description, etc., is sent during a master EPG data base download at a pre determined time several times during the night.

In the embodiment illustrated in the present application, the EPG circuit 116 gets the program information from the XDS low speed data stream carried in line 21 of field 1 and line 22 of field 2 of NTSC signal programs. It obtains this information from the video-input signal from the AV switcher 110 using the horizontal and vertical sync signals obtained from the video processor 114.

The RAM 208 maintains a history log 209 for storing the history information for the previous episodes of programs selected by the viewer. This history information might store, for example, a brief description of the plot, actors, theme, etc. of a particular program. Where the program is one episode of a plurality of episodes of a continuing program, the history might further describe the general theme of the program, e.g., a detective series staring a particular character acted by a particular actor and further describe the salient events which take place in that particular episode.

The processor 210 follows a program stored in the ROM 212 and reads data from, and stores data in, the RAM 208 and EEPROM 214. The processor 210 also supplies the program guide information as RGB or YUV signals to an on-screen display (OSD) portion of the video processor 114. In this way, the video information selected by the viewer using the remote control unit 128 is displayed on the CRT 120.

Figure 3:
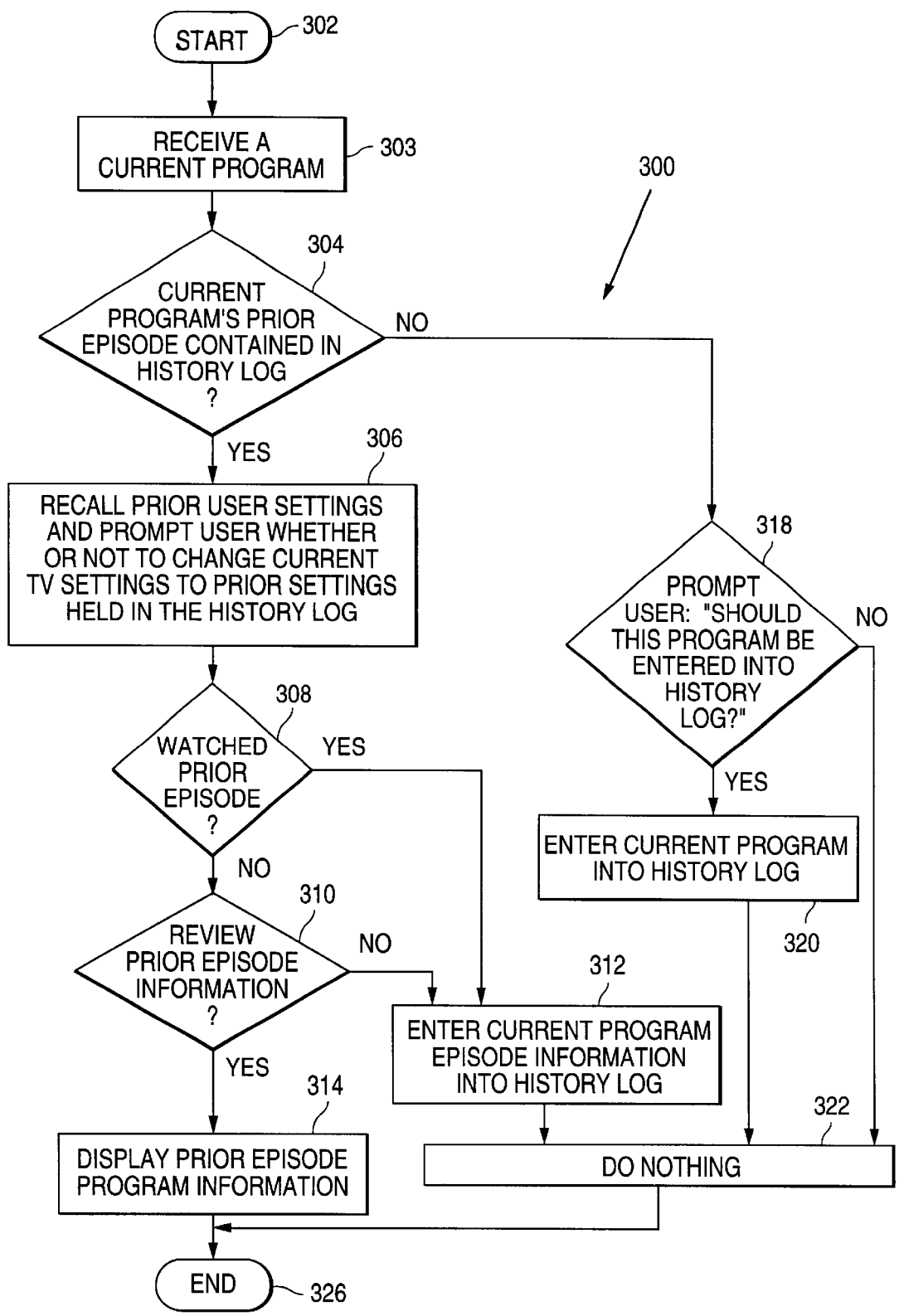
FIG. 3 shows a flowchart illustrating a process of displaying history information for the episodes of a program that are previously broadcast, in accordance with the present invention.

FIG. 3 shows a flowchart illustrating a process followed by the EPG processor 210 in displaying history information for the episodes of the program that were previously broadcast, in accordance with present invention.

To perform the process shown in FIG. 3, the audio-visual system 100 can be operated under two modes, namely, a regular mode and a standby mode. When the power is on, the television set 100 is operated under the regular mode, in which the received audio and video signals can be displayed on the audio-visual system 100. When the power is off, the audio-visual system 100 is operated under the standby mode. In the standby mode, the tuner 108, host processor 126, AV switcher 110, and EPG 116 are powered by a separate portion of the main power system (not shown) in the audio-visual system 100, while the audio processor 112, the video processor 114, the speaker 118, the CRT 120, the vertical and horizontal deflection 122, and the control signal receiving circuit 124 are powered off. Thus, in the standby state, the audio-visual system 100 can still perform the steps of the process shown in FIG. 3, other than the display steps.

At step 303, upon receiving programs that are currently being broadcast from multiple channels, the tuner 108, operating under a remotely entered command from the viewer, selects one of the channels and sends the program (current program) carried in the selected channel to the AV switcher 110, the host processor 126, and the EPG processor 210. From this received signal, the EPG processor 210 identifies the program. Typically a program can be identified by the associated XDS data that is sent with a program in the VBI. Also the EPG data will identify the program. Where the EPG data is from GemStar, it will contain information required to identify a program.

Step 304 allows for a different set of options depending on whether or not a flag for the program was set in the history log 209. The assumption is that if a flag for the program is already set in the history log 209, that the user has indicated that the program was of interest, thus he or she will likely have the same interest in the future. The flag can be set by a specific user command inputted via the remote controller 128, the mere fact that a previous episode of a program was recorded by the user using the VCR 130, or that the user previously watched an episode of the program. Thus a program whose flag is already set in the history log 209 is likely to have been watched or in the case that it was missed the user would like to read about what happened in the prior episode.

At step 304, the EPG processor 210 determines whether the history log 209 contains the history information relating to the previous episode of the current program. If the history log 209 contains the history information relating to the previous episode of the current program, the operation is led to step 306. If the history log 209 does not contain the history information relating to the previous episode of the current program, the EPG processor 210 goes to step 318 where it sends a control signal to cause the video processor 114 to display on the CRT 120 a prompt: "Should this program be entered into the history log?" In a standby mode, the video processor 114 will not respond to the control signal, so that the prompt will not be displayed on the CRT 120.

At step 318, in a regular mode, the EPG processor 210 awaits a response from a viewer. In response to the prompt, a viewer may select either the "Yes" or "No" key on the remote controller 128, which causes the remote controller 128 to send a control signal to the control signal receiving circuit 124. Upon receiving the control signal from the control signal receiving circuit 124, the host processor 126 sends the control signal to the EPG processor 210. If the viewer's answer is "No", the operation is led to step 322. In a preferred embodiment, the viewer can program the system using the remote controller 128, so that, in a standby mode, the EPG goes to step 322 without awaiting a response from a viewer, since presumably the viewer can not be watching the prompt.

If the viewer's answer is "Yes", the operation is led to step 320, where the EPG processor 210 is instructed to make an entry for the current program in the history log. At step 320, the EPG processor 210 stores the name (or identification) of the current program into the history log 209. It should be noted that after the viewer has selected the program at step 320, the EPG processor 210 would remember to store the history information for all current episodes of the program into the history log 209.

At step 322, the EPG processor 210 leads the operation to step 324 to terminate the process without displaying the history information stored in the history log 209.

At step 304, if the current program's prior episode is contained in the history log 209, the EPG processor 210 is caused to recall prior user settings and cause the video processor 114 to display on the CRT 120 a prompt to the user to decide whether or not to change the current TV settings to prior settings. The EPG processor 210 then proceeds to step 308.

Each time the history log 209 is viewed by the user, a bit, i.e., a flag, is set by the CPU 210 in history log 209 so that the next time the history log 209 is opened, the system knows that the user has already read the information on the previous episode, even in the case that the episode's information was deliberately erased. At step 308 the EPG processor 210 further determines whether the previous episode of the program was probably watched at some earlier time on the audio-visual system 100 based on these bits in the history log 209. If the previous episode of the program was displayed on the audio-visual system 100, i.e., watched by the viewer at some earlier time, the operation is led to step 312. If the previous episode of the program has not been displayed on the audio-visual system 100, the EPG processor 210 sends a control signal to cause the video processor 114 to display on the CRT 120 a prompt: "Do you want to review previous episode information?" and the operation is then led to step 310.

At step 310, in a regular mode, the EPG processor 210 awaits a response from a viewer. In response to the prompt, a viewer selects either the "Yes" or "No" key on the remote controller 128, which causes the remote controller 128 to send a control signal to the control signal receiving circuit 124. Upon receiving the control signal from the control signal receiving circuit 124, the host processor 126 sends the control signal to the EPG processor 210. If the viewer's answer is "Yes", the EPG processor 210 leads the operation to step 314. If the viewer's answer is "No", EPG processor 210 leads the operation to step 312.

In a standby mode, the EPG processor 210 leads the operation to step 312 without awaiting a response from a viewer at steps 308 and 310. At step 312, the EPG processor 210 stores the history information for the current program episode into the history log 209. The operation is then led to step 322. At step 322, the EPG processor 210 terminates the process without displaying the history information stored in the history log 209 and ends the process at step 324.

At step 314, the EPG processor 210 retrieves the history information for the previous episode of the program and sends it to the OSD portion of the video processor 114, which displays the history information on the CRT 120. Thereafter, the process is terminated at step 324.

According to the present invention, the program for performing the process shown in FIG. 3 can be stored in the ROM 212 and executed by the EPG processor 210.

Although the present invention has been shown and described with respect to preferred embodiments, various changes and modifications are deemed to lie within the sprit and scope of the invention as claimed. The corresponding structures, materials, acts, and equivalents of all means or step plus function elements in the claims which follow are intended to include any structure, material, or acts for performing the functions in combinations with other claimed elements as specifically claimed.

What is claimed is:

1. A method for receiving and displaying history information using an audio-visual system regarding a program having a plurality of episodes, comprising the steps of:
   (a) receiving both a broadcast of a particular episode of the program and history information, in electronic form, regarding the particular episode;
   (b) determining whether the history information for any previous episodes of the program was stored in the audio-visual system; and
   (c) if any previous episodes were stored in the audio-visual system, automatically storing the history information for the particular episode in the audio-visual system.

2. The method of claim 1, further comprising the steps of:
   (a) receiving a current one of the episodes at a time subsequent to receiving the particular episode; and
   (b) displaying the history information for the particular episode on the audio-visual system.

3. The method of claim 2, further comprising the step of displaying the current episode on the audio-visual system, while the history information regarding the particular episode is being displayed on the audio-visual system.

4. The method of claim 1, wherein the history information includes a description of the particular episode.

5. The method of claim 1, wherein the step of determining whether the history information for any previous episodes of the program was stored in the audio-visual system includes the step of determining if a flag was set in a history log.

6. The method of claim 5, further comprising the step of displaying a prompt to a user of the audio-visual system inviting the user to enter a flag in the history log for the program if it is determined by the flag that the history information for any previous episodes of the program was not stored in the audio-visual system of displaying a prompt to a user of the audio-visual system inviting the user to enter a flag in the history log for the current program.

7. The method of claim 6, further comprising the step, of entering a flag in the history log for the current program in response to a user's command.

8. The method of claim 5, further comprising the step, if it is determined by the flag that the history information for any previous episodes of the program was stored in the audio-visual system, of displaying a prompt to a user of the audio-visual system inviting the user to change the flag settings in the history log.

9. The method of claim 5, further comprising the step, if it is determined by the flag that the history information for any previous episodes of the program was stored in the audio-visual system, of displaying a prompt to a user of the audio-visual system inviting the user to review the prior episode's history information.

10. The method of claim 8, further comprising the step, if the user inputs a command to review the prior episode history information, of displaying the prior episode's history information, and setting a flag in the history log to store the current episode history information if the user does not input the command to review the prior episode history information.

11. The method of claim 1, wherein the audio-visual system is a television system.

12. The method for claim 1, further comprising the steps of:
   (a) receiving a plurality of programs at the audio-visual system, including one or more current episodes of the programs;
   (b) interactively selecting the particular program by the viewer; and
   (c) storing the history information for the current episodes.

13. A method for displaying information on an audio-visual system comprising the steps of:
   selecting a program manually;
   selecting automatically future episodes of the program;
   receiving content descriptive information in electronic form regarding an individual episode of the program automatically each time an individual episode is selected automatically; and
   storing the received content descriptive information regarding selected individual episodes of the selected program as history information locally in the audio-visual system at an end user location;

interactively displaying the history information on the audio-visual system after storing it.

14. The method of claim 13 wherein the audio-visual system is a television system.

15. The method of claim 14 wherein the selecting automatically step operates while power to the television is turned off.

16. The method of claim 13, further comprising the step of prompting a user after a program is manually selected to determine whether future episodes of the program should be automatically selected to have content descriptive information stored.

17. The method of claim 13 wherein the selecting automatically step comprises the steps of:

making an entry identifying the manually selected program in a history log; and selecting signals containing content descriptive information for episodes of the program corresponding to the history log entry.

18. The method of claim 13 wherein the electronic form is an arbitrary signal source containing electronic program guide information.

19. The method of claim 13 wherein the electronic form is a data stream known as extended data service carried in the vertical blanking interval of NTSC program signals.

20. The method of claim 13 wherein the electronic form is a digital television signal's program specific information protocol.

\* \* \* \* \*